April 24, 1962　　A. L. HUBBARD　　3,030,757
COTTON HARVESTER
Filed March 21, 1960
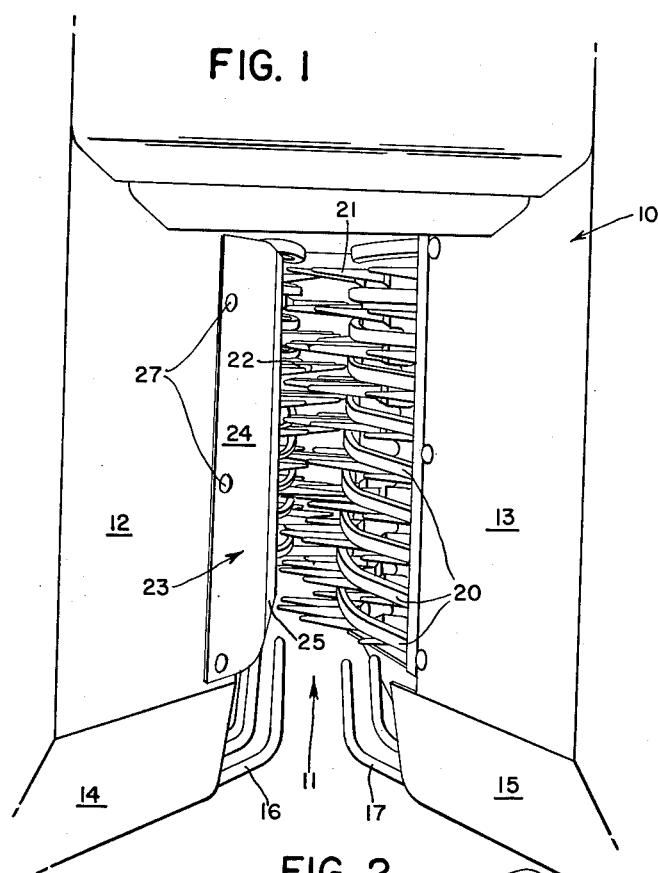
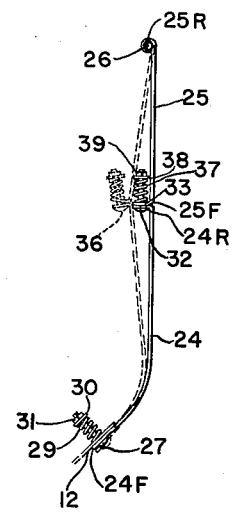
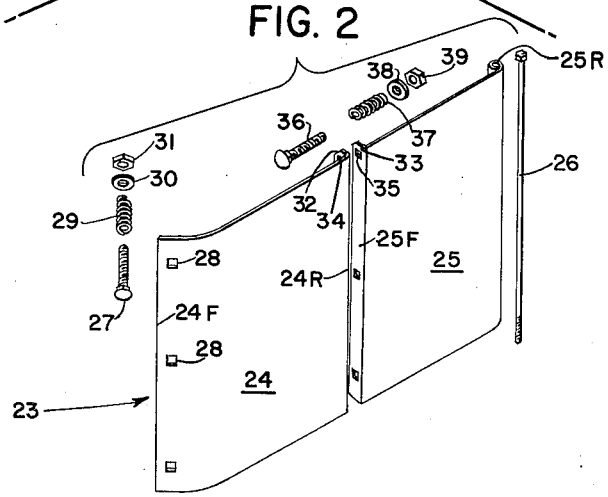
INVENTOR.
A. L. HUBBARD
ATTORNEYS

United States Patent Office 3,030,757
Patented Apr. 24, 1962

3,030,757
COTTON HARVESTER
Arthur L. Hubbard, Des Moines, Iowa, assignor to Deere & Company, Moline, Ill., a corporation of Delaware
Filed Mar. 21, 1960, Ser. No. 16,232
6 Claims. (Cl. 56—43)

This invention relates to a cotton harvester and more particularly to an improvement in a conventional type cotton harvester.

The conventional type of cotton harvester is composed of housing structure having a pair of upright casings spaced apart to define between them a fore-and-aft extending plant passage which receives the cotton plants as the harvester moves forwardly. Each of the casings have open sides adjacent the plant passage through which laterally extending cotton picking spindles or elements extend to engage the cotton on the plants. The picking elements are mounted on a drum rotatable about an upright axis so that the spindles move in an orbit part of which is from front to rear in the plant passage. The picking drums and their associated elements are spaced fore-and-aft relative to one another so that the picking elements of one drum first contact the plants from one side followed by the picking elements of the second drum contacting the plants from the opposite side of the passage. Generally the portion of the casing adjacent the plant passage directly opposite the picking spindles of the other or opposite casing is closed by upright panels so that the plants passing adjacent the panels or walls will be held or restricted in lateral movement as the spindles operate to pick or detach the cotton from the plants. A major problem which results in this type of cotton harvester is that the forward gathering structure of the harvester often times will pick up a foreign object such as a board, log, or stone and will feed it rearwardly into the plant passage and into contact with the picking spindles or elements. Consequently the wall directly opposite to the picking spindles should yield upon large loads being applied against it in order to prevent damage to the spindles.

It is the primary object of the present invention to provide a new and novel arrangement of wall structure positioned in the housing structure and opposite to the picking spindles which will yield upon a large pressure being applied against it and will automatically return to its normal operating position upon the obstruction or foreign matter being passed through the harvester.

To be more specific, it is proposed to provide upright panel structures directly opposite to the picking spindles which are composed of at least two upright panels having adjacent and adjoining upright edges with the opposite edges of each panel being supported on the housing structure in a manner that the panels may yield away from the plant passage. The adjoining edges of the panels have flanges, normal to the plant passage, which lie adjacent to one another and extend inwardly of the casing or housing structure. The flanges are joined together by means of bias-type connections which will permit the flanges to separate and the two panels to yield laterally upon an obstruction passing through the harvester. The bias-type connections will resist such yielding and will also automatically move the flanges into their original side-by-side position upon the obstruction passing.

Other objects and advantages of the invention will become apparent to those skilled in the art as the nature of the invention is better understood from the following description and as shown in the accompanying drawings.

FIG. 1 is a front perspective view looking into the forward portion of a cotton harvester and showing only part of the harvester housing structure.

FIG. 2 is an exploded perspective view of the yieldable panel means adjacent the plant passage.

FIG. 3 is a plan view of the panel means shown in FIG. 2.

Referring now to FIG. 1, there is provided an upright housing structure shown only partially and indicated in its entirety by the reference numeral 10. The housing structure 10 includes portions disposed on opposite sides of a fore-and-aft extending plant passage 11 and includes on opposite sides of the passage upright and outwardly flaring panels 12, 13 and forwardly extending gathering plates 14, 15 projecting from the lower portions of the panels 12, 13. Extending inwardly and then rearwardly from the plates 14, 15 are a plurality of plant lifting rods 16, 17 on opposite sides of the passage 11. The panels 12, 13; plates 14, 15; and lifting rods 16, 17 all operate to guide the plants into the harvester as the harvester moves forwardly and to slightly compress the plants as they pass into the plant passage 11.

Extending rearwardly from the rear edge of the panel 13 and forming the generally open side of the housing structure adjacent that side of the passage is a series of vertically spaced apart horizontally disposed grid bars 20. The grid bars 20 are spaced apart sufficiently and define fore-and-aft extending longitudinal slots through which picking spindles or elements 21, may extend into the passage. The picking elements 21 are of conventional type and are carried on an upright drum which rotates about a vertical axis so that the spindles 21 will move in an orbit, part of which includes lateral movement from front to rear in the stalk passage. The spindles normally rotate about their own axes and are barbed to snag the fibers of the ripe cotton bolls on the cotton plants. A second picking drum having picking spindles 22 is disposed in the housing structure behind the panel 12 and on the same side of the plant passage 11. The spindles 22 and the associated drum are spaced rearwardly of spindles 21 so that the plants moving through the passage will first contact the spindles 21 after which they will pass adjacent to and in contact with the spindles 22. This is more or less conventional in all types of cotton harvesters and is consequently here presented only for purposes of orientation.

On the opposite side of the plant passage from the picking spindles 21 is upright wall structure, here indicated in its entirety by the reference numeral 23. The wall structure 23 is composed of a first or front upright panel 24 curved outwardly at its forward edge to overlie the gathering panel 12. The upright panel 24 has a front edge 24F and a rear edge 24R. Extending rearwardly from the rear edge 24R is a second or rear upright panel 25 having a front edge 25F lying adjacent to the rear edge 24F and a rear edge or portion 25R. The rear portion or edge 25R is rolled into an upright journal which receives an upright and relatively long pivot pin or rod 26 adaptable for connection to the housing structure. Consequently the mounting means for the rear panel 25 is such that the panel 25 may yield laterally away from the spindles 21.

The forward end adjacent the edge 24F of the panel 24 overlies and is connected to the rearward edge of the flare panel 12 by means of three vertically spaced apart bolts 27 which extend through the respective panels. The panel 24 is provided with square openings 28 to receive a square insert integral with the head of the bolts 27. The threaded shanks of the bolts 27 are relatively long and are surrounded by compression springs 29 disposed inside of the flare panel 12. Washers 30 and adjusting nuts 31 are provided on the ends of the bolts 27. Viewing FIG. 3, it becomes apparent that should an obstruction pass through the stalk passage 11 to force the panel 24 to yield, the springs 29 would compress so that the the rearwardly extending panel 24 would yieldably pivot about its forward end and would be permitting lateral movement relative to the passage.

Upright flanges or portions 32, 33 extend normally inwardly and in juxtaposed relation from the rear and front edges 24R and 25F of the respective panels. The flanges 32, 33 are provided with a series of vertically spaced holes 34, 35 normally in registry with one another that receive connecting bolts 36. The flanges 32, 33 are normally biased to a closed position by means of springs 37 which surround the shanks of the bolts 36 and sit behind the flange 33. Washers 38 and adjusting nuts 39 are carried on the ends of the bolts 36 and contact the springs 37. Viewing FIG. 3, it becomes apparent that the springs 37 normally bias the flanges 32, 33 so that they are parallel and normally in contact with one another. However, the springs 37 will yield upon a force being directed normal to either of the panels 24, 25 and the flanges may then be disposed angularly relative to one another.

Viewing the structure as a whole, it will become apparent that should a board, metal strap, or other relatively rigid objects enter into the throat of the cotton harvester, the spindles 21 due to their movement from front to rear in the harvester will cause the object to be driven into the wall structure 23 on the opposite side of the passage. The compression springs 29 and 37 will compress to permit the panels 24, 25 to yield or move away from the passage 11 until the object has either passed from the harvester or has been removed by the operator. However, once the object has passed from the harvesting area the springs 29, 37 will automatically force the panels 24, 25 laterally toward the passage and in their original or normal position.

While only one form of the invention has been shown, it should be recognized that other forms and variations will occur to those skilled in the art. Therefore, it should be understood that while the present description was given for the purpose of concisely and completely illustrating the principles of the invention, it was not the intention to limit or narrow the invention beyond the broad concepts set forth in the appended claims.

What is claimed is:

1. In a cotton harvester having a housing structure defining a fore-and-aft extending plant passage for successively receiving cotton plants, and cotton harvesting mechanism contained within the housing structure on one side of the passage and having laterally extending picking elements adapted to extend into the passage for detaching cotton bolls from the plants, the improvement comprising: upright wall structure on the opposite side of the passage from and facing the picking elements comprising a front upright panel member having front and rear edges and a rear upright panel extending rearwardly from a front adjoining edge to the rear edge of the front panel to a rear upright edge, the adjoining edges of the panels having upright and substantially parallel flanges extending inwardly of said housing and away from the passage; means adjacent the front edge of the front panel and the rear edge of the rear panel respectively mounting the respective panels on the housing structure, said means being effective to permit the portions of the panels extending toward the adjoining ends to yield away from the passage; and biasing means extending between the flanges of the panels yieldably resisting separation of the flanges.

2. In a cotton harvester having a housing structure defining a fore-and-aft extending plant passage for successively receiving cotton plants, and cotton harvesting mechanism contained within the housing structure on one side of the passage and having laterally extending picking elements adapted to extend into the passage for detaching cotton bolls from the plants, the improvement comprising: upright wall structure on the opposite side of the passage from and facing the picking elements comprising a front upright panel member having front and rear edges and a rear upright panel extending rearwardly from a front adjoining edge to the rear edge of the front panel to a rear upright edge, the adjoining edges of the panels having upright and substantially parallel flanges extending inwardly of said housing and away from the passage; vertical pivot means adjacent the front edge of the front panel and the rear edge of the rear panel respectively mounting the respective panels on the housing structure; and biasing means extending between the flanges of the panels yieldably resisting separation of the flanges.

3. In a cotton harvester having a housing structure defining a fore-and-aft extending plant passage for successively receiving cotton plants, and cotton harvesting mechanism contained within the housing structure on one side of the passage and having laterally extending picking elements adapted to extend into the passage for detaching cotton bolls from the plants, the improvement comprising: upright wall structure on the opposite side of the passage from and facing the picking elements comprising a front upright panel member extending rearwardly from a front edge and a rear upright panel extending rearwardly from the front panel to a rear upright edge, the panels having portions thereof between said edges in juxtaposed relation; means adjacent the front edge of the front panel and the rear edge of the rear panel respectively mounting the respective panels on the housing structure, said means being effective to permit the portions of the panels extending toward the adjoining ends to yield away from the passage; and biasing means connecting the juxtaposed portions and yieldably resisting separation of the portions.

4. In a cotton harvester having a housing structure defining a fore-and-aft extending plant passage for successively receiving cotton plants, and cotton harvesting mechanism contained within the housing structure on one side of the passage and having laterally extending picking elements adapted to extend into the passage for detaching cotton bolls from the plants, the improvement comprising: upright wall structure on the opposite side of the passage from and facing the picking elements comprising a front upright panel member extending rearwardly from a front edge and a rear upright panel extending rearwardly from the front panel to a rear upright edge, the panels having portions thereof between said edges in juxtaposed relation, said portions having openings therein in registry with one another; a shank element extending through the openings; a spring on the shank element biasing the portions into close proximity to one another; and means adjacent the front edge of the front panel and the rear edge of the rear panel respectively mounting the respective panels on the housing structure, said means being effective to permit the panels to yield away from the passage.

5. In a cotton harvester having a housing structure defining a fore-and-aft extending plant passage for successively receiving cotton plants, and cotton harvesting mechanism contained within the housing structure on one side of the passage and having laterally extending picking elements adapted to extend into the passage for detaching cotton bolls from the plants, the improvement comprising: a plurality of upright panels on the opposite side of the passage from and facing the picking elements, said panels being disposed in fore-and-aft relation with one another and normally defining a continuous fore-and-aft upright wall, said panels further having portions adjacent their edges in juxtaposed relation; means mounting the front and rear panels on the housing structure, said means being effective to permit the panels to yield away from the passage; and biasing means connecting said juxtaposed portions yieldably resisting separation of the portions.

6. In a cotton harvester having a housing structure defining a fore-and-aft extending plant passage for successively receiving cotton plants, and cotton harvesting mechanism contained within the housing structure on one side of the passage and having laterally extending picking elements adapted to extend into the passage for detaching cotton bolls from the plants, the improvement comprising: a plurality of upright panels on the opposite side of the passage from and facing the picking elements, said panels normally defining a continuous fore-and-aft upright wall, said panels further having portions adjacent their edges in juxtaposed relation; means mounting the panels on the housing structure effective to permit the panels to yield away from the passage; and biasing means connecting said juxtaposed portions yieldably resisting separation of the portions.

References Cited in the file of this patent

UNITED STATES PATENTS

| | | |
|---|---|---|
| 2,140,631 | Johnston | Dec. 20, 1938 |
| 2,830,427 | Odom | Apr. 15, 1958 |